US007681284B1

(12) United States Patent
Schroeder

(10) Patent No.: US 7,681,284 B1
(45) Date of Patent: Mar. 23, 2010

(54) HINGE

(76) Inventor: James L. Schroeder, 5489 Brookview La., Upper Sandusky, OH (US) 43351

(*) Notice: Subject to any disclaimer, the term of this patent is extended or adjusted under 35 U.S.C. 154(b) by 2 days.

(21) Appl. No.: 12/074,913

(22) Filed: Mar. 7, 2008

(51) Int. Cl.
*B62D 25/06* (2006.01)

(52) U.S. Cl. ........................................ 16/372; 160/201

(58) Field of Classification Search .................. 16/372, 16/260, 261, 387, 86.1; 160/201
See application file for complete search history.

(56) References Cited

U.S. PATENT DOCUMENTS

| | | | | |
|---|---|---|---|---|
| 122,088 | A * | 12/1871 | Wells | 16/387 |
| 477,465 | A * | 6/1892 | Smith | 16/372 |
| 487,939 | A * | 12/1892 | Smith | 29/11 |
| 527,975 | A * | 10/1894 | Hart | 16/387 |
| 2,201,968 | A * | 5/1940 | Fischer | 16/372 |
| 2,604,162 | A * | 7/1952 | Hickling et al. | 160/201 |
| 3,376,913 | A * | 4/1968 | Clapsaddle | 160/201 |
| 3,416,589 | A | 12/1968 | Lambein | |
| 3,693,693 | A * | 9/1972 | Court | 160/195 |
| 4,115,900 | A * | 9/1978 | Mihalcheon | 16/104 |
| 4,306,756 | A | 12/1981 | Whiting | |
| 4,809,402 | A * | 3/1989 | Rainville | 16/372 |
| 4,991,639 | A | 2/1991 | Clay, Jr. et al. | |
| 5,235,724 | A | 8/1993 | Perrin et al. | |
| 5,522,446 | A * | 6/1996 | Mullet et al. | 160/229.1 |
| 5,884,363 | A | 3/1999 | Tofts | |
| 5,913,352 | A | 6/1999 | Scates et al. | |
| 6,076,590 | A * | 6/2000 | Ford et al. | 160/229.1 |
| 6,081,966 | A | 7/2000 | Antekeier et al. | |
| 6,463,988 | B1 * | 10/2002 | Mullet et al. | 160/201 |
| 6,968,886 | B2 | 11/2005 | Berry et al. | |
| 7,201,207 | B2 * | 4/2007 | Colston et al. | 160/201 |
| 2004/0007334 | A1 | 1/2004 | Lewis, Jr. | |
| 2005/0273976 | A1 | 12/2005 | Sarver | |

* cited by examiner

*Primary Examiner*—Victor Batson
*Assistant Examiner*—Rowland D Do
(74) *Attorney, Agent, or Firm*—Marshall & Melhorn, LLC

(57) ABSTRACT

A hinge is disclosed having a first leaf, a second leaf and a pin. The first leaf has a first layer and a second layer. The first leaf also has at least two hollow first leaf knuckles that are unitary with both the first layer and the second layer. The second leaf has a first layer and a second layer. The second leaf also has at least two hollow second leaf knuckles that are unitary with both the first and second layer. The pin extends through each of the knuckles to hold the leaves together.

20 Claims, 3 Drawing Sheets

HINGE

FIELD OF THE INVENTION

The present invention relates to a hinge and more specifically to a heavy duty hinge for rolling doors on vehicles.

BACKGROUND OF THE INVENTION

Hinges are well-known devices for permitting one part to move with respect to another part. There are many different types of hinges, but generally most hinges have two main pieces that are pivotally connected to one another by a pin. The pin extends through a knuckle of one piece and a knuckle of the other piece.

Hinges are used in many different types of applications, thus some hinges, because of their design, are not appropriate for all applications. For example, hinges used on rolling-type vehicle doors, such as on semi-trailers, are subject to extreme use and environmental conditions. The hinges used in these applications must be much stronger than ordinary hinges to last in this environment. Further, it has been found that the rolling-type vehicle doors, while becoming stronger themselves, have become heavier.

Therefore, it is desirable to have a rolling-type vehicle door hinge that is robust enough to withstand extreme use, poor environmental conditions and high door weight.

SUMMARY OF THE INVENTION

The present invention is directed toward a hinge having a first leaf, a second leaf, and a pin. The first leaf has a first layer and a second layer. The first layer extends from an outer fastener flange to an inner knuckle portion in a substantially planar fashion. The second layer is substantially parallel with the first layer and extends to the outer fastener flange. The first leaf also has at least two hollow first leaf knuckles at the inner knuckle portion that are unitary with both the first layer and the second layer.

The second leaf has a first layer extending from an outer fastener flange to an inner knuckle portion in a substantially planar fashion. The second leaf also has a second layer that is substantially parallel with the first layer. The second leaf also has at least two hollow second leaf knuckles at the inner knuckle portion that are unitary with both the first layer and the second layer.

The pin extends through each of the first leaf knuckles and the second leaf knuckles. The first leaf knuckles are axially aligned with, and alternate with, the second leaf knuckles.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1A:
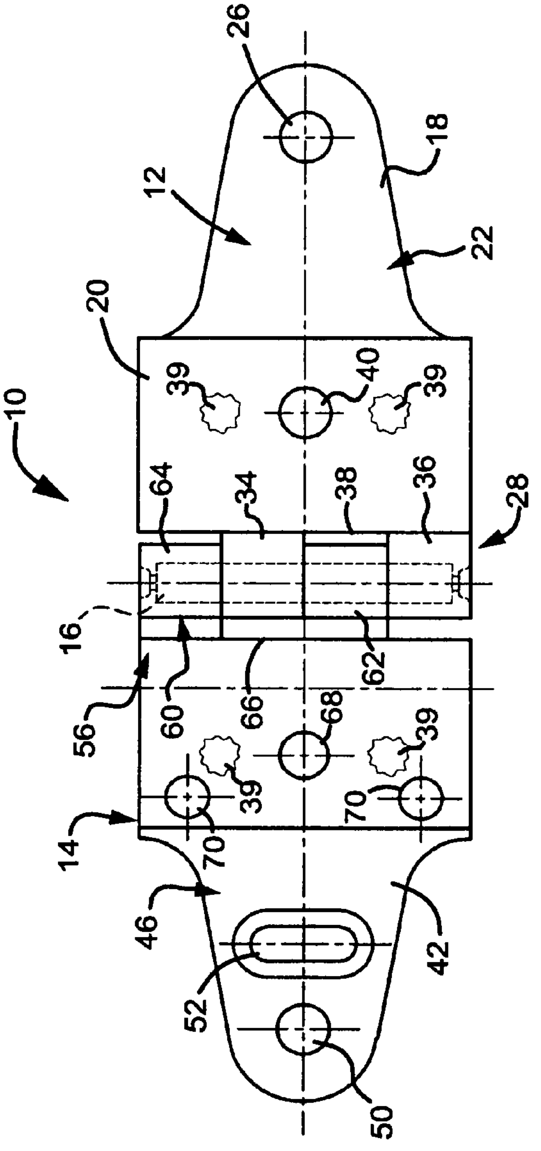
FIG. 1A is a plan view of one embodiment of a hinge.
Figure 1B:
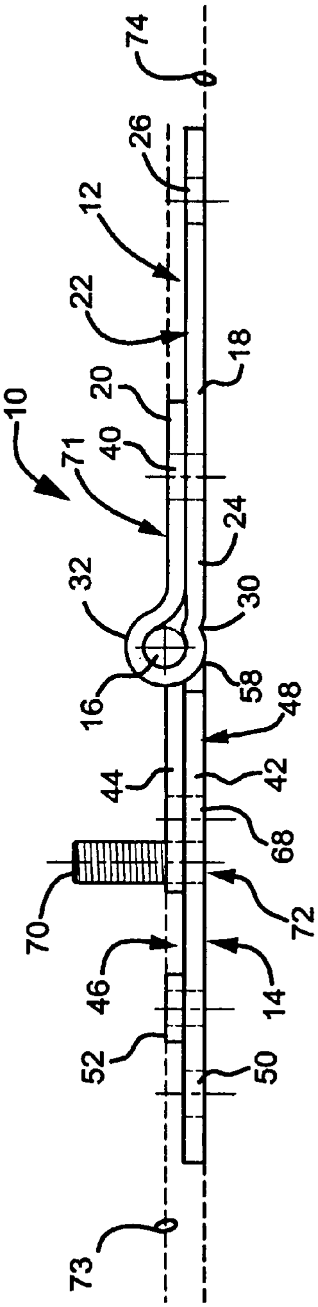
FIG. 1B is a side view of the hinge of FIG. 1A.
Figure 2A:
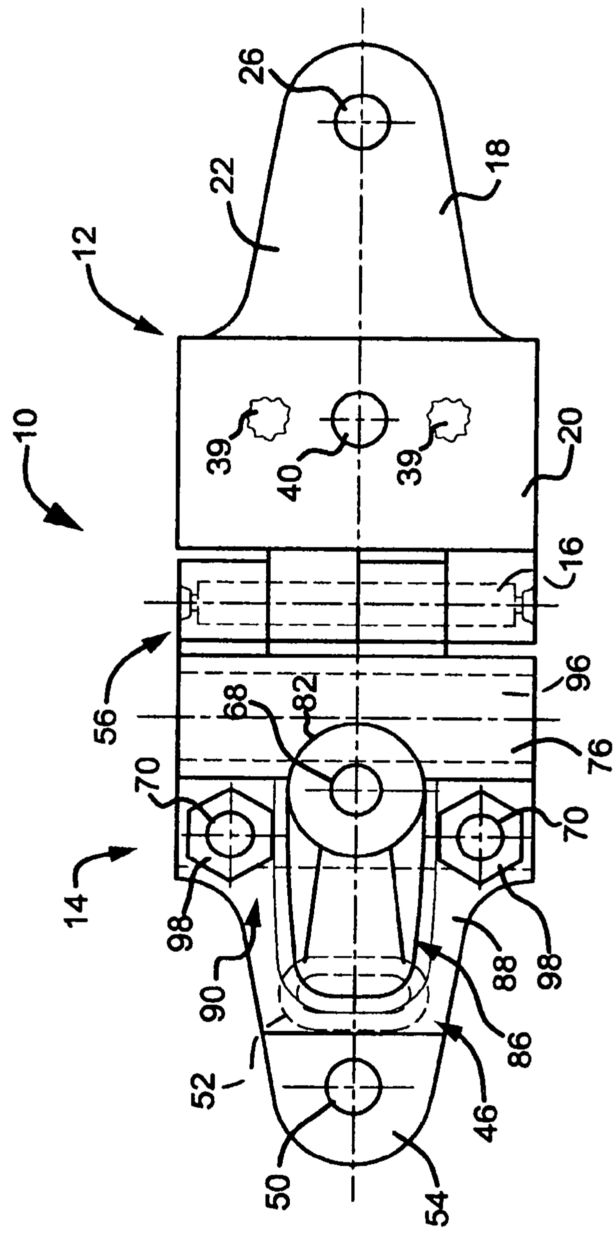
FIG. 2A is a plan view of the hinge of FIG. 1A with a roller cover.
Figure 2B:
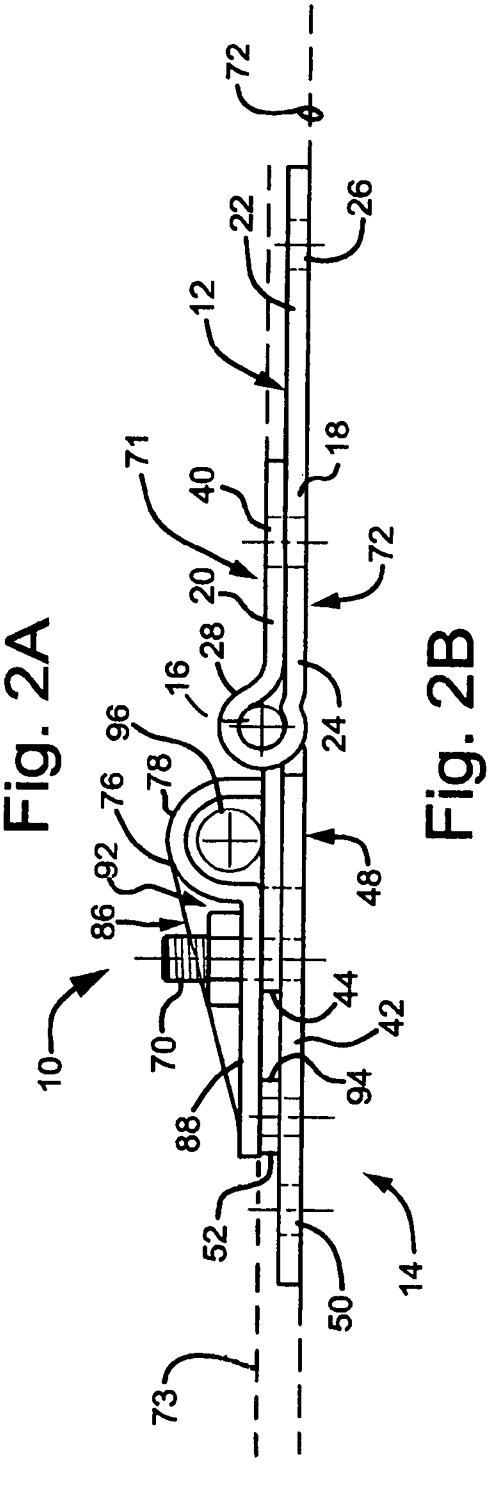
FIG. 2B is a side view of the hinge of FIG. 2A.
Figure 3A:
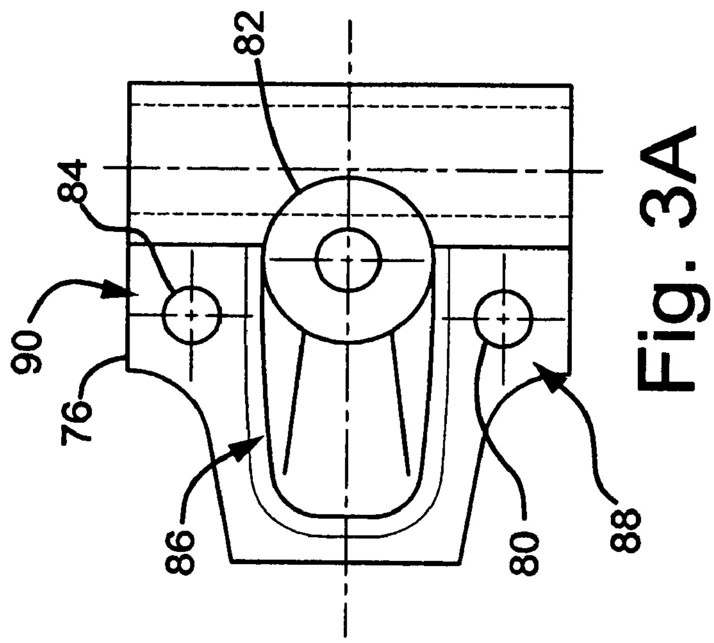
FIG. 3A is a plan view of the roller cover.
Figure 3B:
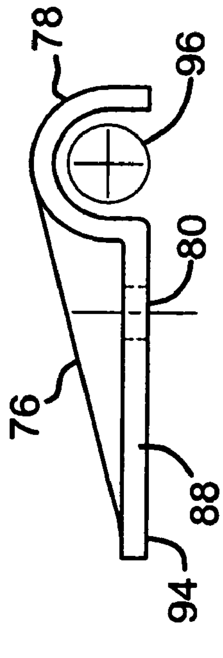
FIG. 3B is a side view of the roller cover.

Turning now to FIGS. 1A and 1B, a hinge 10 is depicted. The hinge 10 is preferably constructed of metal for robustness, however, the hinge 10 is not limited to being constructed just of metal. Instead, the hinge 10 may be constructed of any material suitable for the intended location and use of the hinge 10.

The hinge 10 depicted in this embodiment comprises a first leaf 12, a second leaf 14 and a pin 16. The first leaf 12 is comprised of a first layer 18 and a second layer 20. The first layer 18 is comprised of an outer fastener flange 22 connected to an inner knuckle portion 24. Preferably, the first layer 18 of the first leaf 12 is substantially planar.

The outer fastener flange 22 preferably has at least one fastener aperture 26 extending therethough for receiving a mechanical fastener (not shown). The fastener and an accompanying lock nut may be used to secure the first leaf 12 to a first panel (not shown) of a rolling type door on a vehicle. Additional apertures and fasteners of various shapes, sizes and locations may be used to secure the first leaf 12 to the panel without limitation.

The outer fastener flange 22 is preferably unitary and integrally formed with the inner knuckle portion 24 of the first layer 18. The inner knuckle portion 24 is preferably substantially rectangular, except for the knuckles themselves, which are discussed in more detail below. Preferably, the outer fastener flange 22 tapers down as it extends outwardly from the inner knuckle portion 24.

The inner knuckle portion 24 has at least two hollow first leaf knuckles 28 that are unitary and integrally formed with the inner knuckle portion 24. The first leaf knuckles 28 may have a planar bottom surface 30 and a curvilinear upper surface 32 that tapers down toward the first layer 18.

The first leaf knuckles 28 preferably comprise an inner knuckle 34 and an outer knuckle 36. The inner knuckle 34 is bounded between two second leaf knuckles (described below). The outer knuckle 36 is only bounded by one of the second leaf knuckles. The inner knuckle 34 and the outer knuckle 36 are separated from one another by a land 38, within which one of the second leaf knuckles is located.

Preferably, each outer knuckle of the first leaf has a crimp 39 that reduces its inner diameter $D_1$ so that it is smaller than an outer diameter $D_2$ the pin. This structure prevents the pin 16 from sliding out of the knuckles 28.

The second layer 20 of the first leaf 12 is preferably unitary and integrally formed with the first leaf knuckles 28. The second layer 20 becomes substantially parallel with the first layer 18 and is located directly radially outward from the first layer 18. The second layer 20 extends to the outer fastener flange 22, where it terminates. Preferably, the second layer 20 entirely covers only the inner knuckle portion 24 of the first layer 18.

The first layer 18 and the second layer 20 may be joined by welding, adhesive and/or mechanical fasteners. In the depicted embodiment, the layers 18, 20 are spot welded together in at least two spots, however, the present invention is not limited to just two spot welds and more or less may be used as needed to hold the layers 18, 20 securely together. The spot welds are shown at 39.

A fastener aperture 40 is located through both the first and second layers 18, 20. Preferably, the fastener aperture 40 is aligned with the fastener aperture 26 in the outer fastener flange 22. A fastener (not shown) may be located through the aperture 40. A nut may be located on the fastener to secure the first leaf 12 to the door.

The second leaf 14 is comprised of a first layer 42 and a second layer 44, both of which are substantially planar. The first layers 18, 42 of the first and second leaves 12, 14 are substantially planar with one another. The second layers 20, 44 of the first and second leaves 12, 14 are also substantially planar with another.

The first layer 42 is comprised of an outer fastener flange 46 connected to an inner knuckle portion 48. The outer fastener flange 46 preferably has at least one fastener aperture 50 extending therethough for receiving a mechanical fastener (not shown). The fastener and an accompanying lock nut may be used to secure the second leaf 14 to a first panel (not shown) of a rolling type door on a vehicle. Additional apertures and fasteners of various shapes, sizes and locations may be used to secure the second leaf 14 to the panel without limitation.

The depicted embodiment comprises a stop 52 that extends upwardly from an upper surface 54 of the outer fastener flange 46. The stop 52 may be of any shape, such as an oval shape, as seen from the plan view in FIG. 1A. The stop 52 is located between the fastener aperture 50 in the outer fastener flange 46 and the second layer 44 of the second leaf 14. Preferably, the top of the stop 52 is planar with the top of the second layer 44. The stop 52 is described in more detail below.

The outer fastener flange 46 is preferably unitary and integrally formed with the inner knuckle portion 48 of the first layer 42. The inner knuckle portion 48 is preferably substantially rectangular, except for the knuckles themselves, which are discussed in more detail below. Preferably, the outer fastener flange 46 tapers down as it extends outwardly from the inner knuckle portion 48.

The inner knuckle portion 48 has at least two hollow second leaf knuckles 56 that are unitary and integrally formed with the inner knuckle portion 48. The second leaf knuckles 56 may have a planar bottom surface 58 and a curvilinear upper surface 60 that tapers down toward the first layer 42.

The second leaf knuckles 56 preferably comprise an inner knuckle 62 and an outer knuckle 64. The inner knuckle 62 is bounded between the two first leaf knuckles 28. The outer knuckle 64 is only bounded by one of the first leaf knuckles 28. The inner knuckle 62 and the outer knuckle 64 are separated from one another by a land 66, within which one of the first leaf knuckles 28 is located. Thus, it can be appreciated that the first leaf knuckles 28 are axially aligned with, and alternate with, the second leaf knuckles 56.

Preferably, the outer knuckle 64 of the second leaf 14 has a crimp (not shown) that reduces its inner diameter so that it is smaller than an outer diameter of the pin 16. This structure prevents the pin 16 from sliding out of the knuckles 56.

The second layer 44 of the second leaf 14 is preferably unitary and integrally formed with the second leaf knuckles 56. The second layer 42 becomes substantially parallel with the first layer 42 and is located directly radially outward from the first layer 42 so that it covers substantially the entire inner knuckle portion 48. The second layer 44 extends to the outer fastener flange 46, where it terminates.

The first layer 42 and the second layer 44 may be joined by welding, adhesive and/or mechanical fasteners. In the depicted embodiment, the layers 42, 44 are spot welded together in at least two spots, however, the present invention is not limited to just two spot welds and more or less may be used as needed to hold the layers 42, 44 securely together. The spot welds are shown at 39.

A fastener aperture 68 is located through both the first and second layers 42, 44. Preferably, the fastener aperture 68 is aligned with the fastener aperture 50 in the outer fastener flange 46. It is also preferred that the fastener apertures 26, 40 of the first leaf 12 are aligned with the fastener apertures 50, 68 of the second leaf 14. A fastener (not shown) may be located through the aperture 68. A nut may be located on the fastener to secure the second leaf 14 to the door.

Two threaded fasteners 70 may be located in the second leaf 14. Preferably, the fasteners 70 are located outboard from the fastener aperture 68 located between the inner knuckle portion 48 and outer fastener flange 46, but they may be located anywhere. The fasteners 70 are oriented in a substantially perpendicular relationship to the second leaf 14.

The pin 16 is located through each of the first leaf knuckles 28 and the second leaf knuckles 56. The pin 16 is substantially round in cross-section although other shapes are within the scope of the present invention. The outside diameter $D_2$ of the pin 16 is less than the inside diameter $D_3$ of the leaf knuckles 28, 56 so that the knuckles 28, 56 can freely pivot about the pin 16. The pin 16 nevertheless substantially fills the knuckles 28, 56. Preferably, the pin 16 is entirely enclosed within the knuckles 28, 56 such that it does not extend axially beyond the outer knuckles 36, 64.

The first leaf 12, the second leaf 14 and the knuckles 28, 56 define a bottom surface 72 of the hinge 10 that is entirely located in the same horizontal plane 74. The second layers 20, 44 define an upper surface 71 that is entirely located in the same horizontal plane 73.

As shown in FIGS. 2A, 2B, 3A and 3B, a separable roller cover 76 may be removably secured to the hinge 10. Preferably, the roller cover 76 is a one-piece, unitary structure constructed of metal.

The cover 76 is located only on the second leaf 14 and it preferably has a semi-tubular roller housing 78 and three fastener apertures 80, 82, 84. The cover 76 is comprised of a curvilinear interior portion 86 bounded between two mounting lands 88, 90. The interior portion 86 is located above the second leaf 14 so that a gap 92 exists between the interior portion 86 and the leaf 14. The interior portion 86 tapers down to the two mounting lands 88, 90, which are both in direct contact with the second leaf 14.

The cover 76 also tapers down toward the stop 52 located on the outer fastener flange 46 of the first layer 42. Preferably, a lower surface 94 of the cover 76 is placed in direct contact with the stop 52 to prevent the cover 76 from moving with respect to the hinge 10.

The roller housing 78 is integrally formed with the interior portion 86 and the mounting lands 88, 90. The roller housing 78 abuts the first and second leaf knuckles 28, 56. The roller housing 78 houses the roller shaft 96 above the second leaf 14, between the outer fastener flange 46 of the second leaf 14 and the knuckles 28, 56 of the first and second leaves 12, 14. The roller shaft 96 is thus located at least partially radially outward from the knuckles 28, 56.

A middle fastener aperture 82 is formed from both the roller housing 78 and the curvilinear interior portion 86. The middle fastener aperture 82 aligns with the fastener aperture 68 extending through the first layer 42 and the second layer 44 of the second leaf 14 to provide access to the middle fastener (not shown). An outer fastener aperture 80, 84 is located in each of the mounting lands 88, 90.

The roller shaft 96 is located in the roller housing 78 of the cover 76. The apertures 80, 82 of the cover 76 are aligned with and engaged with the threaded fasteners 70 extending upwardly from the second leaf 14. Mechanical fasteners, such as lock nuts 98, may be located on each of the threaded fasteners 70 and tightened against the cover 76 to secure the cover 76 to the hinge 10.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A hinge, comprising:

a first leaf comprised of a first layer extending from an outer fastener flange to an inner knuckle portion in a substantially planar fashion, said outer fastener flange tapering down substantially from said inner knuckle portion outward, a second layer being substantially parallel with and located entirely against said first layer and extending to said outer fastener flange so as to substantially cover only said entire inner knuckle portion, and at least two hollow first leaf knuckles at said inner knuckle portion that are unitary with both said first layer and said second layer;

a second leaf comprised of a first layer extending from an outer fastener flange to an inner knuckle portion in a substantially planar fashion, said outer fastener flange tapering down substantially from said inner knuckle portion outward, a second layer being substantially parallel with and located entirely against said first layer and extending to said outer fastener flange so as to substantially cover only said entire inner knuckle portion, and at least two hollow second leaf knuckles at said inner knuckle portion that are unitary with both said first layer and said second layer, wherein two threaded fasteners extend perpendicularly upward from said second layer; and a pin extending through each of said first leaf knuckles and said second leaf knuckles, said pin being enclosed entirely within said knuckles and substantially filling said knuckles;

a stop unitary with said outer fastener flange of said second leaf, said stop extending upwardly from said first layer of said second leaf and being coplanar and spaced from said second layer of said second leaf, and configured to contact a separable roller cover;

wherein said first leaf knuckles are axially aligned with, and alternate with, said second leaf knuckles, and wherein said first leaf, said second leaf and said knuckles define a surface substantially in a single horizontal plane.

2. The hinge of claim 1, wherein said first leaf knuckles comprise an inner knuckle and an outer knuckle, said inner knuckle being bounded between two of said second leaf knuckles and said outer knuckle only being bounded by one of said second leaf knuckles.

3. The hinge of claim 1, wherein said second leaf knuckles comprise an inner knuckle and an outer knuckle, said inner knuckle being bounded between two of said first leaf knuckles and said outer knuckle only being bounded by one of said first leaf knuckles.

4. The hinge of claim 1, wherein said outer knuckles of both said first leaf and said second leaf have at least a portion with a smaller inner diameter than an outer diameter of said pin.

5. The hinge of claim 1, wherein said knuckles have a flat bottom surface and a curvilinear upper surface that tapers down to said second layers.

6. The hinge of claim 1, wherein said first layer and said second layer of both of said leaves have spot welds in two places to secure said layers together.

7. The hinge of claim 1, wherein said outer fastener flange for both said first and second leaves has a first through aperture.

8. The hinge of claim 1, wherein a second through aperture is located between said outer fastener flange and said hinge portion of both of said leaves, said second through aperture extending through both said first layer and said second layer.

9. The hinge of claim 1, wherein said pin does not extend axially beyond the outer knuckles of either leaf.

10. The hinge of claim 1, wherein said leaves, said knuckle and said pin are constructed of metal.

11. The hinge of claim 1, wherein a roller housing is mounted over said second leaf so as to locate a roller shaft adjacent said knuckles.

12. A hinge, comprising:

a first leaf comprised of a first layer extending from an outer fastener flange to an inner knuckle portion in a substantially planar fashion, a second layer being substantially parallel with said first layer and extending to said outer fastener flange, and at least two hollow first leaf knuckles at said inner knuckle portion that are unitary with both the first layer and the second layer;

a second leaf comprised of a first layer extending from an outer fastener flange to an inner knuckle portion in a substantially planar fashion, a second layer being substantially parallel with said first layer but terminating before said outer fastener flange, and at least two hollow second leaf knuckles at said inner knuckle portion that are unitary with both the first layer and the second layer, wherein in said portion of said second leaf having overlapping first and second layers, two threaded fasteners extend from said portion in a perpendicular fashion, wherein said outer fastener flange has a unitary upwardly extending stop located between said overlapping layers and a fastener aperture in said outer fastener flange;

a pin extending through each of said first leaf knuckles and said second leaf knuckles;

a separable roller cover located only on said second leaf and having a semi-tubular roller housing and fastener apertures, wherein said stop extends upwardly from said first layer of said second leaf and being coplanar and spaced from said second layer of said second leaf and contact a lower surface of said cover;

wherein said first leaf knuckles are axially aligned with, and alternate with, said second leaf knuckles.

13. The hinge of claim 12, wherein said tubular roller housing abuts said first and second leaf knuckles.

14. The hinge of claim 12, wherein said cover has a curvilinear interior portion extending upwardly from said first layer of said second leaf and two planar outer lands bounding said curvilinear interior portion.

15. The hinge of claim 12, wherein said roller housing houses a roller shaft above said second leaf, between said outer fastener flange and said knuckles and directly adjacent said knuckles.

16. The hinge of claim 12, wherein said second layer of said first and second leaves entirely lie in a single horizontal plane and the first layer of said first and second leaves entirely lie in a different, single horizontal plane.

17. The hinge of claim 14, wherein a middle fastener aperture is formed from both said tubular roller housing and said curvilinear interior portion.

18. The hinge of claim 14, wherein one outer fastener aperture is located in each of said lands.

19. The hinge of claim 14, wherein said curvilinear interior portion tapers down toward said outer fastener flange of said second leaf so that a bottom surface of said roller cover abuts said stop on said fastener flange.

20. The hinge of claim 15, wherein said roller shaft is located at least partially radially outward from said knuckles.

* * * * *